United States Patent [19]

Leimer et al.

[11] Patent Number: 4,495,122

[45] Date of Patent: Jan. 22, 1985

[54] METHOD FOR THE PRODUCTION OF A POLYCRYSTALLINE SHAPED BODY OF SILICON CARBIDE

[75] Inventors: Gerhard Leimer; Ernst Gugel, both of Bavarian, Fed. Rep. of Germany

[73] Assignee: Feldmühle Aktiengesellschaft, Dusseldorf, Fed. Rep. of Germany

[21] Appl. No.: 324,324

[22] Filed: Nov. 23, 1981

[30] Foreign Application Priority Data

Nov. 24, 1980 [DE] Fed. Rep. of Germany ....... 3044161

[51] Int. Cl.$^3$ ............................................. C04B 35/56
[52] U.S. Cl. ..................................... 264/65; 264/325; 501/88; 501/90
[58] Field of Search .................... 264/65, 325; 501/88, 501/90

[56] References Cited

U.S. PATENT DOCUMENTS

| | | | |
|---|---|---|---|
| 4,172,109 | 10/1979 | Smoak | 264/65 |
| 4,237,085 | 12/1980 | Smoak | 264/65 |
| 4,372,902 | 2/1983 | Denton et al. | 264/65 |

*Primary Examiner*—Mark Bell
*Attorney, Agent, or Firm*—Toren, McGeady and Stanger

[57] ABSTRACT

Method for the production of a polycrystalline shaped body of silicon carbide of a density of at least 98% of the theoretical density of silicon carbide, prepared through pressureless sintering at temperatures from 1,900 to 2,200 C. from at least 97 weight % of $\alpha$-silicon carbide and/or $\beta$-silicon carbide under addition of up to 3 weight % of boron, characterized by the fact that the shaped body is prepared without any carbon additions to the batch and is pressureless sintered in a carbon containing protective gas atmosphere.

4 Claims, No Drawings

METHOD FOR THE PRODUCTION OF A POLYCRYSTALLINE SHAPED BODY OF SILICON CARBIDE

The invention consists of a method for the production of polycrystalline shaped bodies of silicon carbide with a density of at least 98% of the theoretical density of silicon carbide.

Polycrystalline shaped bodies of silicon carbide are characterized by many valuable properties like oxidation resistance, thermal shock resistance, favorable creep behavior, relatively low density, low thermal expansion and high thermal conductivity, and high hardness. Because of these properties silicon carbide offers great advantages for applications as high temperature machine components.

Comparatively high strength values of up to 600 N/mm$^2$ and more can be achieved with hot pressed silicon carbide which compositionally consists practically only of silicon carbide with minor amounts of aluminum compounds, boron compounds, and iron compounds. However, this process is expensive and therefore not used for economic reasons. Besides, the method is suitable only for relatively simple shapes.

More complicated shapes can be achieved through pressureless sintering of silicon carbide.

A pressureless sintered silicon carbide is described in DE-OS No. 24 49 662. The essential feature of that theory is the use of an extremely fine-grained silicon carbide powder in order to obtain a surface of disturbed electron neutrality and therefore high sintering activity, i.e., to employ powders that permit atomic mobility. One starts with the β-modification of silicon carbide because it can be fabricated in ways that result in extremely fine-grained silicon carbide and no additional fragmenting is required. An essential part of the production method is the adjustment of the ratio of grain boundary energy to surface energy through additions of boron and carbon to a ratio that is favorable for sintering under shrinkage. Boron dissolves moderately in silicon carbide and decreases therefore the grain boundary energy. Carbon increases the surface energy because it frees the silicon carbide from the always present SiO$_2$ skin.

DE-OS No. 26 24 641 describes that the α-modification of silicon carbide can be sintered pressureless too when the silicon carbide has been prepared sufficiently fine. Boron and carbon serve again as sintering additives. An important advantage of being able to use the α-modification of silicon carbide is the fact that no phase transformation occurs when certain sintering temperatures are exceeded, as is the case with the β-modification of silicon carbide. The phase transformation of the β-modification of silicon carbide is accompanied by growth of very large grains, which prevents further densification or, if the material is dense already, leads to poor strength. The range in sintering temperature for an optimal densification of the β-modification of silicon carbide is relatively narrow and can therefore in large furnace installations be controlled only with considerable effort.

A dense polycrystalline shaped body of α-silicon carbide and a method for its production through pressureless sintering are described in the European patent application No. 0004031. α-silicon carbide in the form of a submicron powder is cold pressed and shaped under addition of small amounts of an aluminum compound other than an oxide and a carbon containing additive like carbon black, phenolic formaldehyde condensation products, or coal tar pitch and subsequently sintered pressureless at temperatures from 2,000° C. to 2,300° C. This is based on experiments which showed that excessive grain growth occurs in the pressureless method too at high sintering temperatures when the starting material is α-silicon carbide with boron and carbon containing additives and that an inhomogeneous microtexture results in the finished sintered bodies. The sintered bodies obtained in that way are of about 96% TD (theoretical density), but specimens sintered at temperatures from 2,100° C. are largely recrystallized and the hot transverse rupture strength is below 300 N/mm$^2$. Only the specimens sintered at 2,050° C. are of homogeneous fine-grained microtexture with an average grain size of 5 μm.

The conclusion is that the pressureless sintering of silicon carbide with boron containing additives is difficult to achieve if sintered bodies of high density as well as uniformly fine-grained microtexture are to be produced.

According to European patent application No. 0004031, aluminum and carbon are used as additives in order to make polycrystalline shaped bodies of silicon carbide that can be produced in a simple way and are of improved properties, especially high temperature strength. The aluminum and the nitrogen and carbon, if present, are essentially contained in the silicon carbide lattice in the form of a solid solution such that they can, for example, not be identified as separate phases at magnifications up to 2,400×.

With these additives one can achieve transverse rupture strengths of the sintered bodies of at least 500 N/mm$^2$ at room temperature and the strengths are retained for temperature increases up to 1,600° C. The transverse rupture strength was, however, determined by the three-point method which yields higher results than todays four-point method.

In particular, polycrystalline shaped bodies fabricated by this method, obviously the most advanced one, show comparatively large scatter, i.e., the finished shaped bodies show large deviations in individual strength.

The purpose of the present invention is to provide a method for the production of polycrystalline shaped bodies of silicon carbide that employs pressureless sintering yet achieves strength values of an order of magnitude comparable to that of shaped bodies of hot pressed silicon carbide and, in addition, with comparably low scatter.

The method for the production of polycrystalline shaped bodies of a density of at least 98% of the theoretical density of silicon carbide, prepared through pressureless sintering at temperatures from 1,900° to 2,200° C. of at least 97 weight % α-silicon carbide and/or β-silicon carbide under addition of up to 3 weight % of boron, is characterized by the fact that the shaped body is prepared without any carbon additions to the batch and is pressureless sintered in a carbon containing protective gas atmosphere.

The carbon containing protective gas atmosphere is preferably realized through a protective gas atmosphere that contains hydrocarbons.

A further improvement of the invention can be achieved when especially fine and ultra-pure silicon carbide is used as starting material.

Additionally, the shaped body can be subjected to a hot isostatic aftertreatment.

It is, for example, advantageous to use as silicon carbide powder a powder with a specific surface area between 10 and 20 m$^2$/g in which at least 95% of the grains are below 1 μm in size, and which is free of impurities that reduce to metals and are liquid at the sintering temperature.

The method assures that values can be achieved that are comparable to those achieved with hot pressed silicon carbide shaped bodies.

The attached table lists two different silicon carbide shaped bodies, where shaped body I was prepared using current technology and shaped body II was produced by the method of this invention. One sees clearly the improvements possible in the critical parameters of the shaped body through this invention.

Sintering in an atmosphere enriched in gaseous boron is already known and the problem of this invention can therefore not be solved in this way. It was, however, found that improved strength values can be achieved only if the introduction of carbon through additions is avoided entirely.

|   | Additive | Firing Atmosphere | Bulk Density | MOR max, | MOR av. | Weibul Modulus m |
|---|---|---|---|---|---|---|
| I | 2,5 C 0,5 B | Argon | 3,15 | 350 | 300 | 5 |

|   | Additive | Firing Atmosphere | Bulk Density | MOR max, | MOR av. | Weibul Modulus m |
|---|---|---|---|---|---|---|
| II | 0,5 B | 50% Argon 50% C$_3$H$_8$* | 3,18 | 550 | 520 | 10 |

*As example for all pyrolysable hydrocarbons

We claim:

1. In a method for the production of a polycrystalline shaped body of silicon carbide of a density of at least 98% of the theoretical density of silicon carbide, prepared through pressureless sintering at temperatures from 1,900° to 2,200° C. from at least 97 weight % of α-silicon carbide or β-silicon carbide under addition of up to 3 weight % of boron, the improvement which comprises said shaped body being prepared without any carbon additions to the batch and being pressureless sintered in a carbon containing protective gas atmosphere.

2. The method of claim 1, wherein the carbon containing protective gas atmosphere contains pyrolysable hydrocarbons.

3. The method of claim 1, wherein the silicon carbide powder used is a powder with a specific surface area between 10 and 20 m$^2$/g in which at least 95% of the grains are below 1 μm in size and which is free of impurities that reduce to metals and are liquid at the sintering temperatures.

4. The method of claim 1 or 2, wherein the shaped body is subjected to a hot isostatic aftertreatment.

* * * * *